(12) United States Patent
Oberheide et al.

(10) Patent No.: US 10,129,250 B2
(45) Date of Patent: *Nov. 13, 2018

(54) SYSTEM AND METHOD OF NOTIFYING MOBILE DEVICES TO COMPLETE TRANSACTIONS

(71) Applicant: Duo Security, Inc., Ann arbor, MI (US)

(72) Inventors: Jon Oberheide, Ann Arbor, MI (US); Douglas Song, Ann Arbor, MI (US); Adam Goodman, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,193

(22) Filed: May 4, 2018

(65) Prior Publication Data
US 2018/0255054 A1    Sep. 6, 2018

Related U.S. Application Data

(63) Continuation of application No. 15/363,468, filed on Nov. 29, 2016, now Pat. No. 9,992,194, which is a
(Continued)

(51) Int. Cl.
*H04L 29/06*     (2006.01)
*H04L 9/32*      (2006.01)
(Continued)

(52) U.S. Cl.
CPC ........ *H04L 63/0853* (2013.01); *G06F 21/305* (2013.01); *G06F 21/31* (2013.01);
(Continued)

(58) Field of Classification Search
CPC ..... H04L 63/0853; H04L 63/083; H04L 9/32; H04L 9/321; H04W 12/06; H04W 12/08; G06F 21/305; G06F 21/32
See application file for complete search history.

(56) References Cited

U.S. PATENT DOCUMENTS 5,838,792 A    11/1998  Ganesan
5,870,723 A     2/1999  Pare et al.
(Continued)

OTHER PUBLICATIONS

F. Aloul, S. Zahidi and W. El-Hajj, "Two factor authentication using mobile phones," 2009 IEEE/ACS International Conference on Computer Systems and Applications, Rabat, 2009, pp. 641-644.*
(Continued)

*Primary Examiner* — Karl L Schmidt
(74) *Attorney, Agent, or Firm* — Jeffrey Schox; Padowithz Alce

(57) ABSTRACT

A method including registering an authority device for an account on an auth platform; receiving transaction request from an initiator to the auth platform; messaging the authority device with the transaction request; receiving an authority agent response from the authority device to the auth platform; if the authority agent response confirms the transaction, communicating a confirmed transaction to the initiator; and if the authority agent response denies the transaction, communicating a denied transaction to the initiator.

16 Claims, 5 Drawing Sheets

Related U.S. Application Data continuation of application No. 13/039,209, filed on Mar. 2, 2011, now Pat. No. 9,544,143.

(60) Provisional application No. 61/309,885, filed on Mar. 3, 2010.

(51) Int. Cl.
  H04W 12/06 (2009.01)
  G06F 21/30 (2013.01)
  G06F 21/32 (2013.01)
  H04W 12/08 (2009.01)
  G06F 21/31 (2013.01)

(52) U.S. Cl.
  CPC ............... *G06F 21/32* (2013.01); *H04L 9/32* (2013.01); *H04L 9/321* (2013.01); *H04L 63/083* (2013.01); *H04W 12/06* (2013.01); *H04W 12/08* (2013.01)

(56) References Cited

U.S. PATENT DOCUMENTS

| | | |
|---|---|---|
| 6,119,096 A | 9/2000 | Mann et al. |
| 6,209,091 B1 | 3/2001 | Sudia et al. |
| 6,694,025 B1 | 2/2004 | Epstein et al. |
| 6,747,679 B1 | 6/2004 | Finch, II et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 6,996,716 B1 | 2/2006 | Hsu |
| 7,000,247 B2 | 2/2006 | Banzhof |
| 7,080,077 B2 | 7/2006 | Ramamurthy et al. |
| 7,093,133 B2 | 8/2006 | Hopkins et al. |
| 7,096,354 B2 | 8/2006 | Wheeler et al. |
| 7,107,246 B2 | 9/2006 | Wang |
| 7,146,009 B2 | 12/2006 | Andivahis et al. |
| 7,172,115 B2 | 2/2007 | Lauden |
| 7,331,518 B2 * | 2/2008 | Rable ............... G06Q 20/10 235/380 |
| 7,334,255 B2 | 2/2008 | Lin et al. |
| 7,349,929 B2 | 3/2008 | Pfitzner |
| 7,373,515 B2 | 5/2008 | Owen et al. |
| 7,386,720 B2 | 6/2008 | Sandhu et al. |
| 7,447,784 B2 * | 11/2008 | Eun ............... G06Q 30/0601 709/220 |
| 7,463,637 B2 | 12/2008 | Bou-Diab et al. |
| 7,496,662 B1 | 2/2009 | Roesch et al. |
| 7,526,792 B2 | 4/2009 | Ross |
| 7,562,382 B2 | 7/2009 | Hinton et al. |
| 7,562,385 B2 | 7/2009 | Thione et al. |
| 7,571,471 B2 | 8/2009 | Sandhu et al. |
| 7,574,733 B2 | 8/2009 | Woodhill |
| 7,599,493 B2 | 10/2009 | Sandhu et al. |
| 7,603,547 B2 | 10/2009 | Patrick et al. |
| 7,610,390 B2 | 10/2009 | Yared et al. |
| 7,630,493 B2 | 12/2009 | Sandhu et al. |
| 7,711,122 B2 | 5/2010 | Allen et al. |
| 7,721,328 B2 | 5/2010 | Boulos et al. |
| 7,752,450 B1 | 7/2010 | Palmer et al. |
| 7,764,970 B2 | 7/2010 | Neil et al. |
| 7,793,110 B2 | 9/2010 | Durfee et al. |
| 7,831,682 B2 | 11/2010 | Certain et al. |
| 7,836,501 B2 | 11/2010 | Sobel et al. |
| 7,904,608 B2 | 3/2011 | Price |
| 7,953,979 B2 | 5/2011 | Borneman et al. |
| 7,958,362 B2 | 6/2011 | Hwang |
| 7,961,645 B2 | 6/2011 | Gudipudi et al. |
| 7,982,595 B2 | 7/2011 | Hanna et al. |
| 7,983,987 B2 | 7/2011 | Kranzley |
| 8,028,325 B2 | 9/2011 | Cahill |
| 8,028,329 B2 | 9/2011 | Whitcomb |
| 8,099,368 B2 | 1/2012 | Coulter et al. |
| 8,108,253 B2 | 1/2012 | Poon et al. |
| 8,136,148 B1 * | 3/2012 | Chayanam ............... G06F 21/34 713/183 |
| 8,141,146 B2 | 3/2012 | Ozeki |
| 8,151,317 B2 | 4/2012 | Hinton et al. |
| 8,151,333 B2 | 4/2012 | Zu et al. |
| 8,161,527 B2 | 4/2012 | Curren |
| 8,185,744 B2 | 5/2012 | Brown et al. |
| 8,196,177 B2 | 6/2012 | Hinton |
| 8,200,980 B1 | 6/2012 | Robinson et al. |
| 8,225,392 B2 | 7/2012 | Dubrosky |
| 8,245,044 B2 * | 8/2012 | Kang ..................... G06Q 20/12 705/35 |
| 8,259,947 B2 | 9/2012 | Rose et al. |
| 8,275,672 B1 | 9/2012 | Nguyen et al. |
| 8,280,979 B2 | 10/2012 | Kunz et al. |
| 8,296,562 B2 | 10/2012 | Williams et al. |
| 8,332,627 B1 | 12/2012 | Matthews et al. |
| 8,335,933 B2 | 12/2012 | Humphrey et al. |
| 8,340,287 B2 | 12/2012 | Sandu |
| 8,340,635 B2 | 12/2012 | Herz |
| 8,380,192 B2 | 2/2013 | Kim |
| 8,381,297 B2 | 2/2013 | Touboul |
| 8,397,301 B2 | 3/2013 | Hering et al. |
| 8,402,508 B2 | 3/2013 | Rouskov et al. |
| 8,402,526 B2 | 3/2013 | Ahn |
| 8,418,168 B2 | 4/2013 | Tyhurst |
| 8,458,335 B2 | 6/2013 | Holzer |
| 8,458,798 B2 | 6/2013 | Williams et al. |
| 8,468,609 B2 | 6/2013 | Leggette |
| 8,495,720 B2 | 7/2013 | Counterman |
| 8,499,149 B2 | 7/2013 | Chen |
| 8,499,339 B2 | 7/2013 | Chao et al. |
| 8,510,820 B2 | 8/2013 | Oberheide et al. |
| 8,528,039 B2 | 9/2013 | Chakarapani |
| 8,538,028 B2 | 9/2013 | Yeap et al. |
| 8,539,544 B2 | 9/2013 | Garimella et al. |
| 8,539,567 B1 | 9/2013 | Logue et al. |
| 8,544,068 B2 | 9/2013 | Yates et al. |
| 8,548,426 B2 | 10/2013 | Smith |
| 8,549,601 B2 * | 10/2013 | Ganesan ................ G06F 21/42 726/8 |
| 8,571,220 B2 | 10/2013 | Ollikainen et al. |
| 8,578,162 B2 | 11/2013 | Jentzsch |
| 8,595,809 B2 * | 11/2013 | Chayanam ............... G06F 21/34 713/183 |
| 8,595,822 B2 | 11/2013 | Schrecker et al. |
| 8,601,554 B2 | 12/2013 | Gordon et al. |
| 8,612,305 B2 | 12/2013 | Dominguez et al. |
| 8,627,438 B1 | 1/2014 | Bhimanaik |
| 8,635,679 B2 | 1/2014 | Hardt |
| 8,646,057 B2 | 2/2014 | Counterman |
| 8,646,060 B1 * | 2/2014 | Ben Ayed ........... H04L 63/0853 726/9 |
| 8,646,086 B2 | 2/2014 | Chakra et al. |
| 8,667,578 B2 | 3/2014 | Ladki et al. |
| 8,689,287 B2 | 4/2014 | Bohmer et al. |
| 8,700,729 B2 | 4/2014 | Dua |
| 8,707,409 B2 | 4/2014 | Shah et al. |
| 8,713,329 B2 | 4/2014 | Schneider |
| 8,713,639 B2 | 4/2014 | Cheeniyil |
| 8,719,930 B2 | 5/2014 | Lapsley et al. |
| 8,732,019 B2 | 5/2014 | Brown et al. |
| 8,732,475 B2 | 5/2014 | Fahrny et al. |
| 8,732,839 B2 | 5/2014 | Hohl |
| 8,745,703 B2 | 6/2014 | Lambert et al. |
| 8,751,801 B2 | 6/2014 | Harris et al. |
| 8,756,567 B2 | 6/2014 | Jentsch et al. |
| 8,756,651 B2 | 6/2014 | Baer et al. |
| 8,763,077 B2 | 6/2014 | Oberheide et al. |
| 8,769,643 B1 | 7/2014 | Ben Ayed |
| 8,806,609 B2 | 8/2014 | Gladstone et al. |
| 2,639,997 A1 | 9/2014 | Wiesmaier et al. |
| 8,850,516 B1 | 9/2014 | Hrebicek et al. |
| 8,862,097 B2 | 10/2014 | Petrus et al. |
| 8,891,772 B2 | 11/2014 | D'Souza et al. |
| 8,893,230 B2 | 11/2014 | Oberheide et al. |
| 8,898,762 B2 | 11/2014 | Kang |
| 8,949,927 B2 | 2/2015 | Arnott |
| 8,966,587 B2 | 2/2015 | Nair |

(56) References Cited

U.S. PATENT DOCUMENTS

| | | | |
|---|---|---|---|
| 8,984,276 B2 | 3/2015 | Benson et al. | |
| 9,032,069 B2 | 5/2015 | Van Biljon et al. | |
| 9,049,011 B1 | 6/2015 | Agrawal | |
| 9,055,107 B2 | 6/2015 | Medvinsky et al. | |
| 9,069,947 B2 | 6/2015 | Kottahachchi et al. | |
| 9,071,611 B2 | 6/2015 | Yadav | |
| 9,076,343 B2 | 7/2015 | Chaar | |
| 9,154,387 B2 | 10/2015 | Maki | |
| 9,209,978 B2 | 12/2015 | Besehanic | |
| 9,223,961 B1 | 12/2015 | Sokolov | |
| 9,258,296 B2 | 2/2016 | Juthani | |
| 9,270,663 B2 | 2/2016 | Kravitz et al. | |
| 9,282,085 B2 | 3/2016 | Oberheide et al. | |
| 9,338,156 B2 | 5/2016 | Oberheide et al. | |
| 9,361,468 B2 | 6/2016 | Peddada | |
| 9,401,918 B2 | 7/2016 | Lu et al. | |
| 9,407,632 B2 | 8/2016 | Agarwal | |
| 9,418,213 B1 | 8/2016 | Roth et al. | |
| 9,443,084 B2 | 9/2016 | Nice et al. | |
| 9,495,533 B2 | 11/2016 | Yiu et al. | |
| 9,497,184 B2 | 11/2016 | Fork et al. | |
| 9,607,142 B2 | 3/2017 | Dharmarajan et al. | |
| 9,706,410 B2 | 7/2017 | Sreenivas et al. | |
| 9,736,153 B2 | 8/2017 | McDaniel et al. | |
| 9,768,963 B2 | 9/2017 | Chu et al. | |
| 2002/0131404 A1 | 9/2002 | Mehta et al. | |
| 2003/0115452 A1 | 6/2003 | Sandhu et al. | |
| 2004/0139318 A1 | 7/2004 | Fiala et al. | |
| 2005/0097352 A1 | 5/2005 | Patrick et al. | |
| 2005/0268107 A1* | 12/2005 | Harris | G06F 21/31 713/182 |
| 2006/0021018 A1 | 1/2006 | Hinton et al. | |
| 2007/0101145 A1 | 5/2007 | Sachdeva et al. | |
| 2007/0156592 A1 | 7/2007 | Henderson | |
| 2007/0228148 A1* | 10/2007 | Rable | G06Q 20/10 235/379 |
| 2007/0250914 A1 | 10/2007 | Fazel et al. | |
| 2007/0254631 A1 | 11/2007 | Spooner | |
| 2007/0284429 A1 | 12/2007 | Beeman | |
| 2007/0297607 A1 | 12/2007 | Ogura | |
| 2008/0120411 A1* | 5/2008 | Eberle | G06Q 50/10 709/225 |
| 2008/0229104 A1 | 9/2008 | Ju et al. | |
| 2008/0301669 A1 | 12/2008 | Rao et al. | |
| 2009/0055906 A1 | 2/2009 | Von Willhorff | |
| 2009/0077060 A1 | 3/2009 | Sermersheim et al. | |
| 2009/0083225 A1 | 3/2009 | Jacobs et al. | |
| 2009/0167489 A1 | 7/2009 | Nan et al. | |
| 2009/0259848 A1* | 10/2009 | Williams | H04L 63/0838 713/168 |
| 2010/0023781 A1 | 1/2010 | Nakamoto | |
| 2010/0042954 A1 | 2/2010 | Rosenblatt et al. | |
| 2010/0107225 A1 | 4/2010 | Spencer et al. | |
| 2010/0125737 A1* | 5/2010 | Kang | G06Q 20/12 713/176 |
| 2010/0180001 A1* | 7/2010 | Hardt | G06F 11/32 709/207 |
| 2010/0319068 A1 | 12/2010 | Abbadessa et al. | |
| 2011/0026716 A1 | 2/2011 | Tang | |
| 2011/0138469 A1 | 6/2011 | Ye | |
| 2011/0197267 A1 | 8/2011 | Gravel | |
| 2011/0219449 A1 | 9/2011 | St Neitzel | |
| 2011/0302410 A1 | 12/2011 | Clarke | |
| 2012/0063601 A1 | 3/2012 | Hart | |
| 2012/0096274 A1 | 4/2012 | Campagna | |
| 2012/0227098 A1 | 9/2012 | Obasanjo | |
| 2012/0278454 A1 | 11/2012 | Stewart et al. | |
| 2013/0060708 A1 | 3/2013 | Oskolkov et al. | |
| 2013/0110676 A1 | 5/2013 | Kobres | |
| 2013/0125226 A1 | 5/2013 | Shah et al. | |
| 2013/0239168 A1 | 9/2013 | Sreenivas et al. | |
| 2013/0239177 A1 | 9/2013 | Sigurdson et al. | |
| 2013/0310006 A1 | 11/2013 | Chen et al. | |
| 2013/0326224 A1 | 12/2013 | Yavuz | |
| 2013/0326493 A1 | 12/2013 | Poonamalli et al. | |
| 2014/0047546 A1 | 2/2014 | Sidagni | |
| 2014/0188796 A1 | 7/2014 | Fushman et al. | |
| 2014/0201841 A1 | 7/2014 | Deshpande et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |
| 2014/0244993 A1 | 8/2014 | Chew | |
| 2014/0245278 A1 | 8/2014 | Zellen | |
| 2014/0247140 A1 | 9/2014 | Proud | |
| 2014/0351954 A1 | 11/2014 | Brownell et al. | |
| 2015/0012914 A1 | 1/2015 | Klein et al. | |
| 2015/0026461 A1 | 1/2015 | Devi | |
| 2015/0242643 A1 | 8/2015 | Hankins et al. | |
| 2016/0212129 A1 | 7/2016 | Johnston et al. | |
| 2016/0286391 A1 | 9/2016 | Khan | |
| 2016/0300231 A1* | 10/2016 | Shavell | G06Q 20/4016 |
| 2016/0366589 A1* | 12/2016 | Jean | H04L 63/083 |

OTHER PUBLICATIONS

Kher, Vishal, and Yongdae Kim. "Securing distributed storage: challenges, techniques, and systems." Proceedings of the 2005 ACM workshop on Storage security and survivability. ACM, 2005, pp. 9-25.*

Bonneau, Joseph, et al. "Passwords and the evolution of imperfect authentication." Communications of the ACM 58.7 (2015): 78-87.*

Aloul S Zahidi; et al. "Two factor authentication using mobile phones," 2009 IEEE/ACS International Conference on Computer Systems and Applications, Rabat, 2009, pp. 641-644.

Edge, Kenneth, et al. "The use of attack and protection trees to analyze security for an online banking system." System Sciences, 2007. HICSS 2007. 40th Annual Hawaii International Conference on. IEEE, 2007.

Goldfeder et al., Securing Bitcoin wallets via a new DSA/ECDSA threshold signature scheme, http://www.cs.princeton.edu/~stevenag/threshold_sigs.pdf.

Kher Vishal; et al. "Securing distributed storage: challenges, techniques and systems." Proceedings of the 2005 ACM workshop on Storage security and survivability. ACM, 2005, pp. 9-25.

Neuenhofen, Kay, and Mathew Thompson. "A secure marketplace for mobile java agents." Proceeding of the second international Conference on Autonomous agents. ACM, 1998. (pp. 212-218).

Simske et al., "APEX: Automated Policy Enforcement eXchange", Sep. 21-24, 2010, ACM, pp. 139-142.

Symantec, Administration guide for symantec Endpoint protection and symantec network access control, 2009, version 11.00.05.00.00.

Symantec, Administration Guide for Symantec TM Endpoint Protection and Symantec Network Access Control, Aug. 1, 2007.

* cited by examiner

SYSTEM AND METHOD OF NOTIFYING MOBILE DEVICES TO COMPLETE TRANSACTIONS

CROSS-REFERENCE TO RELATED APPLICATIONS

This application is a continuation of U.S. application Ser. No. 15/363,468, filed 29 Nov. 2016, which claims the benefit of U.S. application Ser. No. 13/039,209, filed 2 Mar. 2011 and U.S. Provisional Application No. 61/309,885, filed 3 Mar. 2010, all of which are incorporated in their entireties by this reference.

TECHNICAL FIELD

This invention relates generally to the digital security services field, and more specifically to a new and useful system and method of notifying mobile devices to complete transactions in the digital security field.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). However, many of these solutions are burdensome to users, requiring the user to remember information or carry extra devices to complete a transaction. Thus, there is a need in the digital security services field to create a new and useful system and method of notifying mobile devices to complete transactions. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
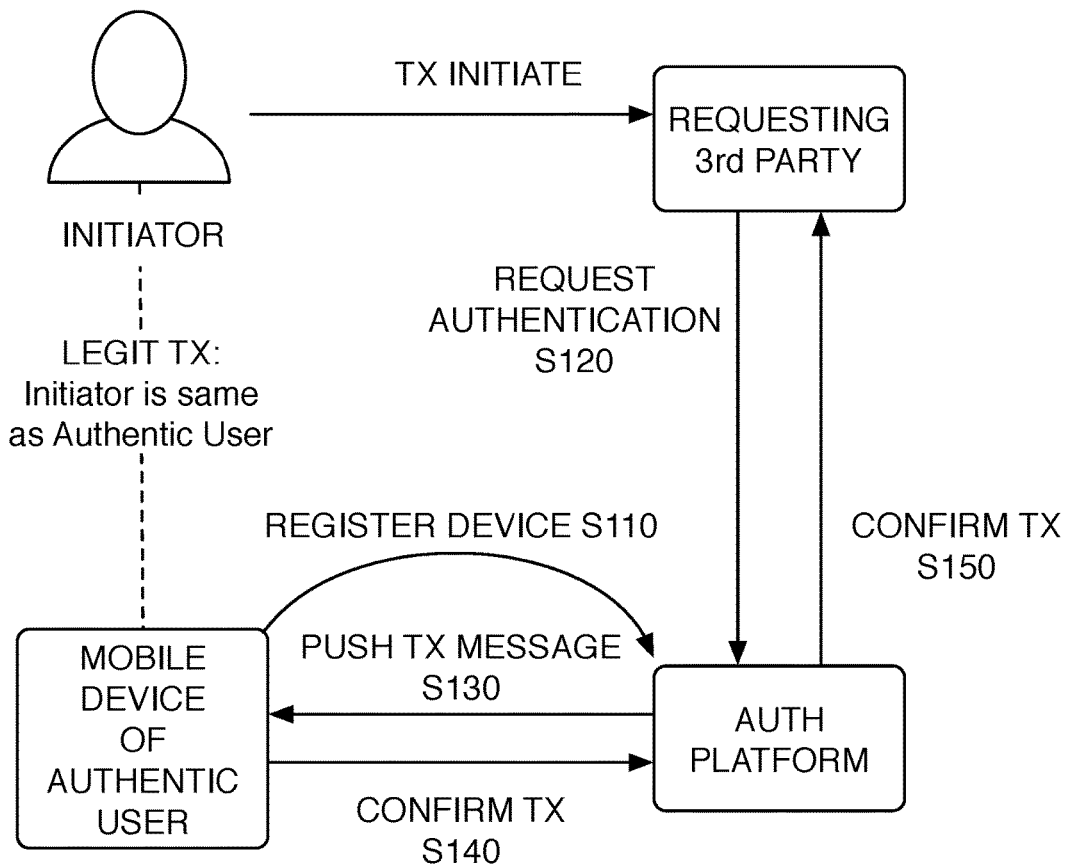
FIGS. 1 and 2 are schematic representations of a method of a preferred embodiment for authenticating a transaction.
Figure 2:
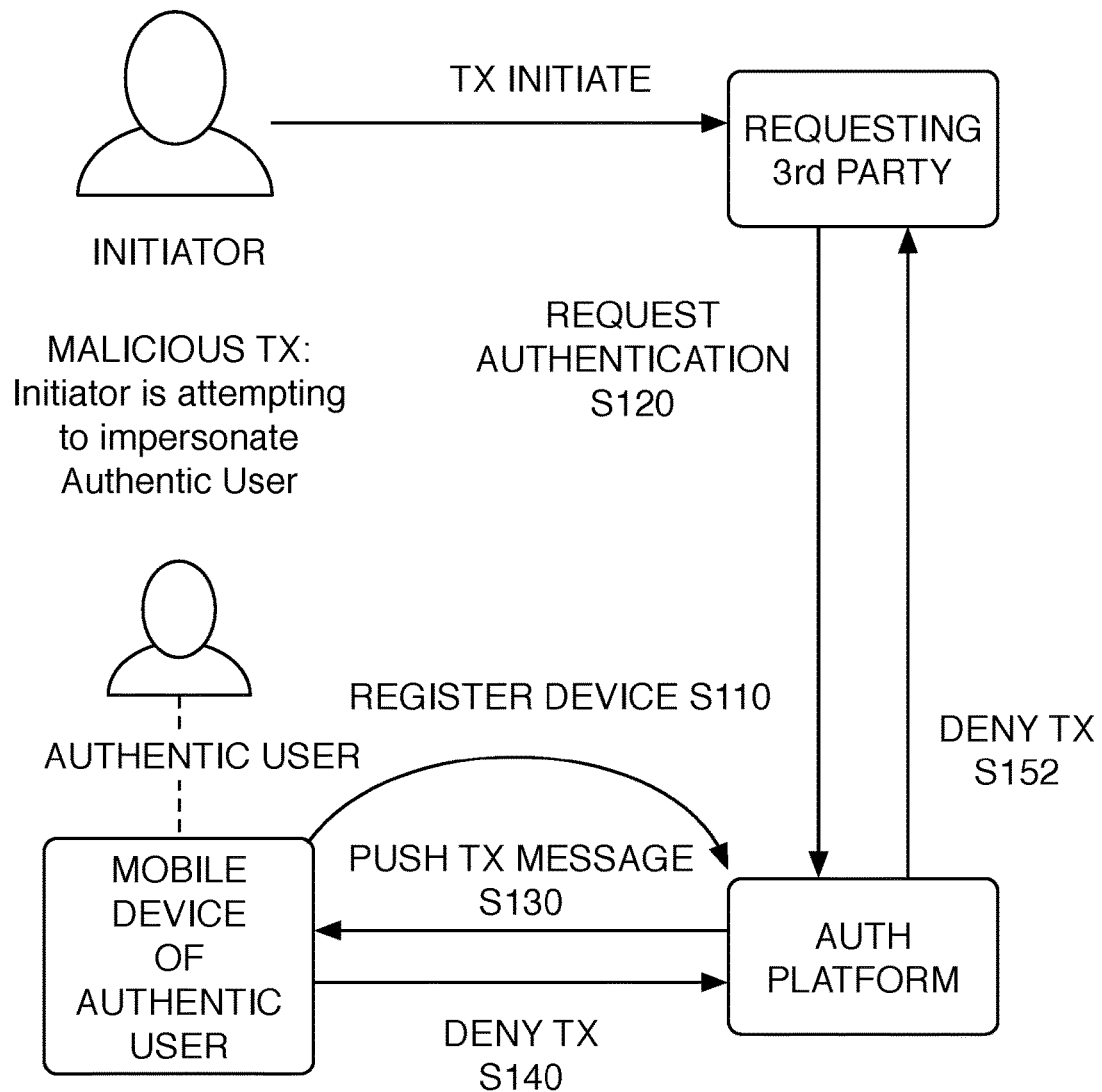
Figure 3:
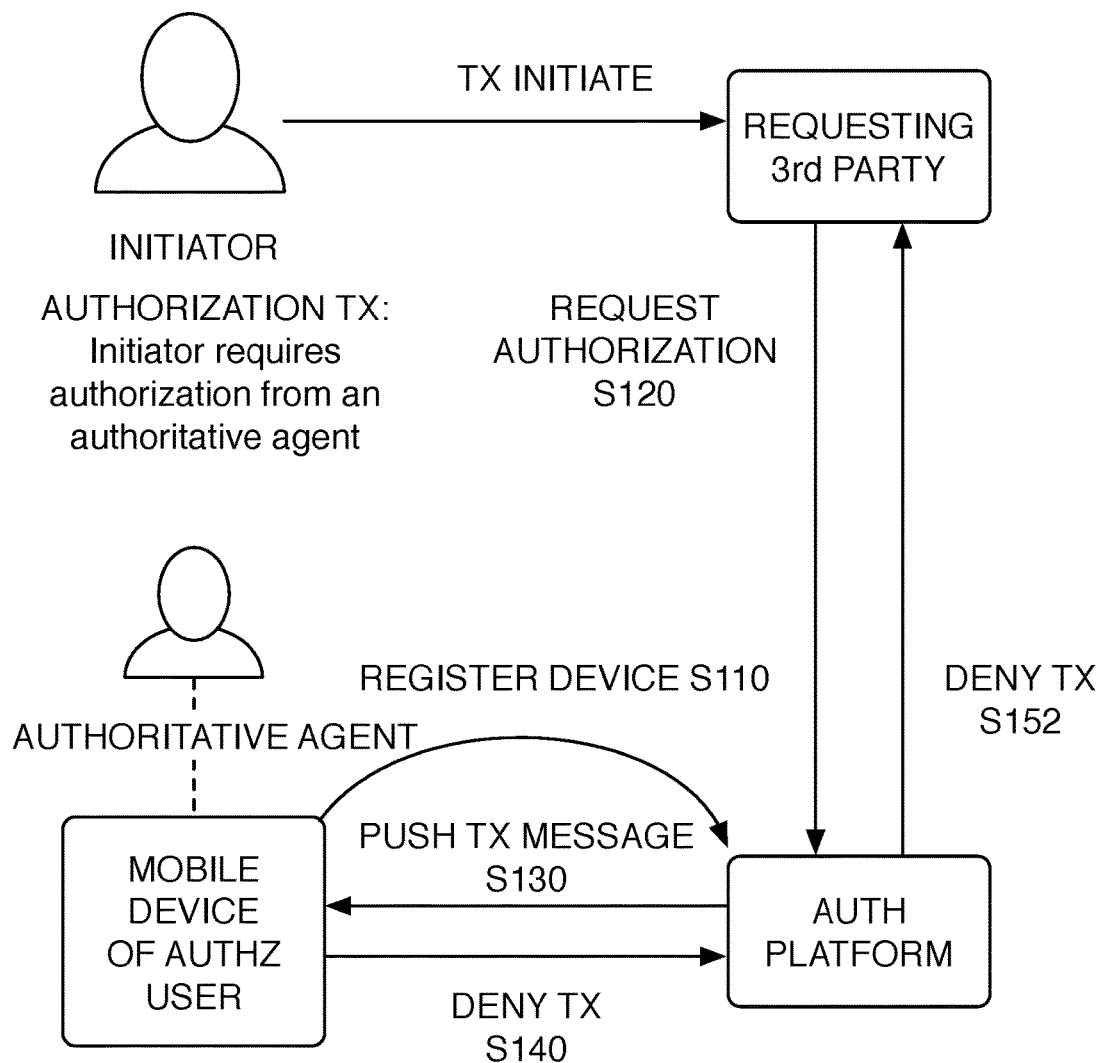
FIG. 3 is a schematic representation of a method of a preferred embodiment for authorizing a transaction.

As shown in FIGS. 1-3, the method of the preferred embodiments for notifying mobile devices to complete transactions includes registering an authority device for an account on an auth platform S110, receiving a transaction request from an initiator to the auth platform S120, messaging the authority device with the transaction request S130, receiving an authority agent response from the authority device to the auth platform S140, if the authority agent response confirms the transaction, communicating a confirmed transaction to the initiator S150, and if the authority agent response denies the transaction, communicating a denied transaction to the initiator S152. The method functions to use push-based challenges on mobile device for the authentication and/or authorization of parties involved in a transaction. The method functions to utilize non-intrusive techniques while providing improved security. The pushed messages preferably alert a user to the transaction request in real-time such that a decision of confirmation or denial of a transaction can be communicated to a requesting party with minimal time lag (e.g., preferably less than a minute, and more preferably less than 10 seconds). The method may be employed as standalone transaction validation or incorporated into a multifactor system. The method may be used in application such as web-based applications, remote access credentials, privileged account management, financial transactions, password recovery/reset mechanisms, physical access control, Automatic Teller Machine (ATM) withdrawals, domain name transfers, online or offline transactions, building access security, or any suitable application requiring authentication and/or authorization.

The method is preferably performed by an auth platform that communicates with a client of an initiating agent and an authority device associated with an account of the auth platform. The auth platform is preferably an internet accessible server that may be hosted on a distributed computing system, but may be hosted on any suitable platform. The initiating agent is typically a user or process that initiates a transaction. The requested transaction is preferably initiated by the initiating agent through a client such as a website, application, or device (e.g., an ATM machine). For authentication, the initiator agent may be a legitimate party or a malicious party attempting to fraudulently impersonate the legitimate party. For authorization, the initiating agent may be a legitimate authenticated party but may require approval from other parties to perform the action of the transaction. The authority device is preferably a device associated with an authentic agent that is a user or process that is legitimately authenticated or authorized to execute transactions. Even if a malicious entity were attempting to impersonate a user or authentic agent through stolen credentials or other means, they would—ideally—lack the authority device to complete a transaction.

Figure 4:
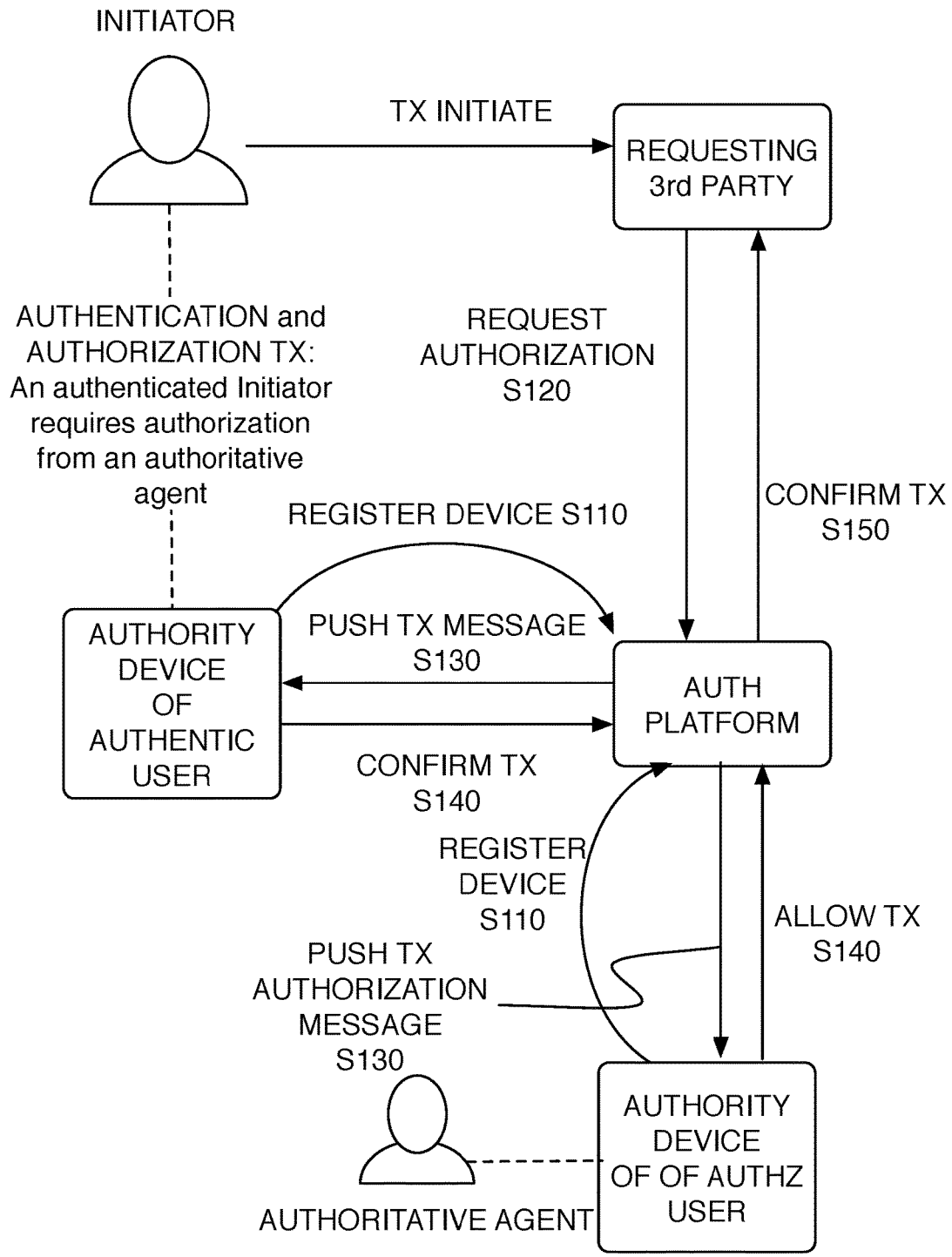
FIG. 4 is a schematic representation of a method of a preferred embodiment for authenticating and authorizing a transaction.
Figure 5:
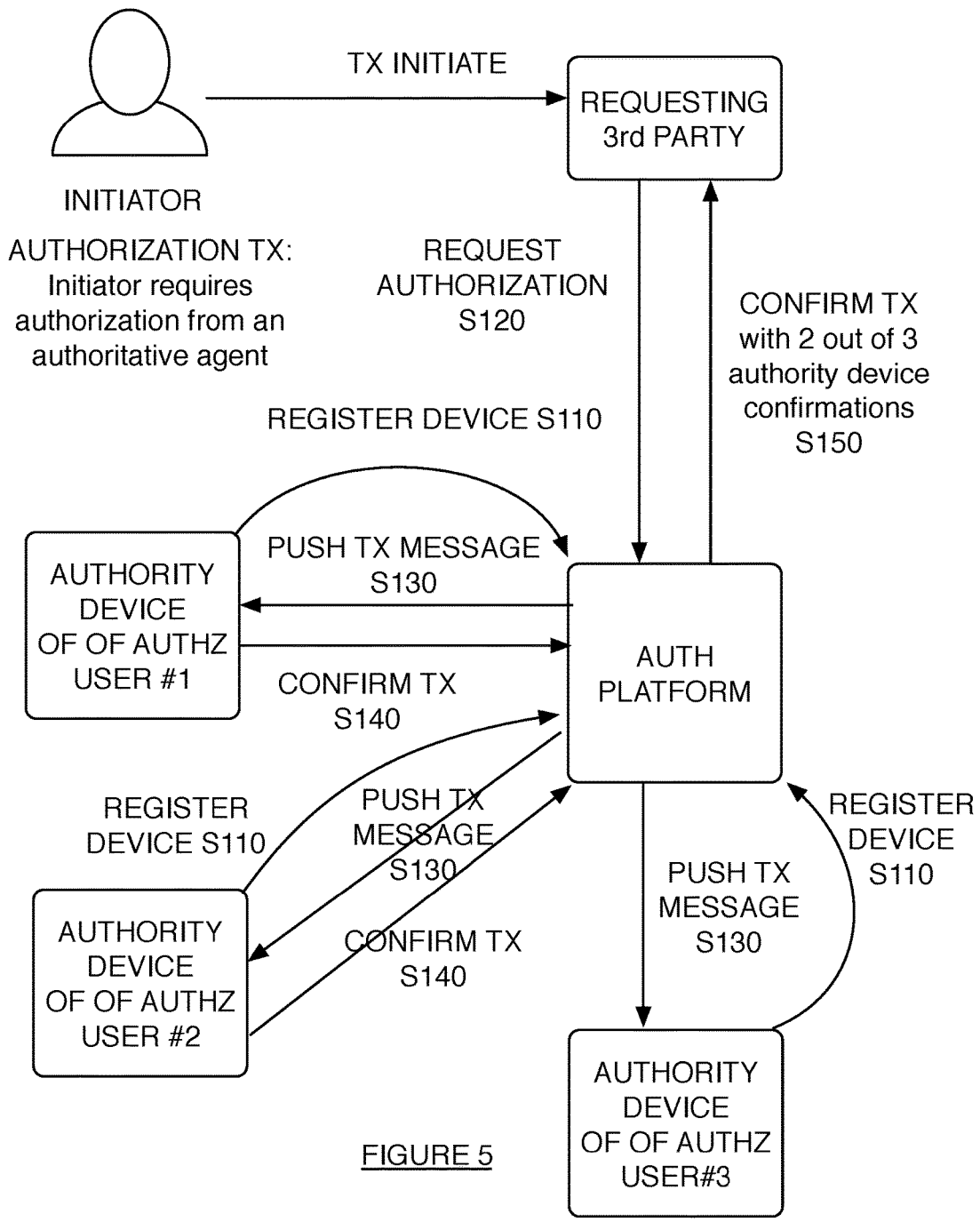
FIG. 5 is a schematic representation of a method of a preferred embodiment with a plurality of authority devices.

Step S110, which includes registering an authority device for an account on an auth platform, functions to identify a device of an agent that is permitted to authenticate or authorize transactions. The registration preferably occurs prior to a transaction request, and is preferably performed during an initial setup of an account on the auth platform. During the setup authentication and/or authorization rules are preferably set. The authority device is preferably a mobile computing device possessed by an authentic user or an authorized agent. The mobile device is preferably a mobile phone, tablet computer, smartphone, personal data assistant (PDA), personal computer, and/or any suitable computing device. The authority device preferably has access to a network over which communication with the auth platform is performed, such as a WiFi network, local-area network, telephony network, short message service (SMS) network, multimedia messaging service (MMS), or any suitable network. A plurality of devices may additionally be registered, as shown in FIG. 5. A second authority device may provide a backup communication point if a primary authority device does not respond. For example, after attempting to contact a primary authority device, the auth platform may message a secondary authority device for authentication or authorization. Or, alternatively, a threshold of two confirmations may need to be received to authorize a transaction. Additionally, a first authority device may be registered for authenticating the identity of an agent of the transaction request, and a second authority device may be registered for authorizing an action of an agent such that authentication and authorization may both be enabled, as shown in FIG. 4.

Step S120, which includes receiving a transaction request from an initiator to the auth platform, functions to initiate a transaction. The transaction is preferably any event, transfer, action, or activity that requires authentication and/or authorization of an involved party. Exemplary transactions may include logging into a website, application or computer system; a user withdrawing money from an ATM; a user initiating a "forgotten password" procedure; a user attempting to enter a restricted area of a building or environment; a payment exchange between two entities; a user attempting to perform a restricted action in a computer system; and/or any suitable application requiring authentication and/or authorization. Authentication preferably includes validating the identity of at least one involved party relevant to a transaction. Authorization preferably includes validating authority or permission of an entity to execute a transaction. For authentication, the authority device preferably belongs to the authentic user for self-approval of transactions. For authorization, the authority device preferably belongs to an authoritative user that is preferably in charge of regulating transactions of a user involved in the transaction. The transactions are preferably initiated in an online environment, where parties may be communicating using a computing device or public/private network, but the transactions may alternatively occur offline where parties may be interacting in the real world. The user or device initiating the transaction is ideally a legitimate party, as shown in FIG. 1, but in the situations where a malicious party initiates or participates in the transaction, the method is preferably able to properly identify such a situation, as shown in FIG. 2. After a malicious transaction is prevented the approval rules for a transaction may be dynamically altered to increase security. The transaction is preferably sent from a requesting entity such as a website, application, or device. The requesting entity is typically a system in communication with the auth platform. An application programming interface (API) or any suitable protocol is preferably used to communicate between the requesting entity and the auth platform. In one variation, the communication sent from the requester is encrypted and the authority device preferably decrypts the information. This variation preferably prevents the auth platform from inspecting or accessing the communicated information which may be applicable when a third party is passing sensitive information through the auth platform. As an alternative variation, the communication between the requester and the auth platform is preferably encrypted or otherwise cryptographically protected and communication between the auth platform and the authority device verifies that the communication is from the authority device. Any suitable steps may be taken to secure the communication between the requesting entity, the auth platform and the authority device.

Step S130, which includes messaging the authority device with the transaction request, functions to push a notification to a secondary device for authentication or authorization. The authority device is preferably a device only the authentic user or an authorized user would possess. The message is preferably sent through a communication channel between the authority device and the auth platform. The communication channel is preferably a push notification service provided through the authority device. The communication channel may alternatively be a short message system SMS network, email, a instant message, an in-app notification system, web based websocket or publication-subscription channels, image based transmission of transaction information such as through QR-codes captured by a camera, or any suitable technique for messaging the device. The messages preferably appear on the authority device or create an alert in substantially real-time (e.g., in less than 5 minutes). The realtime aspect of the messaging functions to enable authentication and authorization at the time of the transaction. In one variation, tracking a registered authority device may additionally be performed by the auth platform. For example, in a persistent TCP/IP connection model, a mobile device moving from a service provider data network to a WiFi network may change IP addresses and therefore initiate a new persistent connection. Upon receiving that new connection and an identifier of the mobile device, the auth platform preferably updates the state of the device for the account associated with that device. Then, the proper connection is preferably used for messaging the authority device. Some communication channels may have limited throughput and lack the capability to present a full message from the auth platform. For example, SMS messages have a 160 character limit. An initial message may include a unique identifier, which can then be used to retrieve a full message. For example, the SMS message may include a URL link or code which can be used to retrieve a full message from an application or website. The full message may provide additional information and options for a transaction response. The messages transmitted over the communication channel may additionally be cryptographically signed and encrypted using an established setup between the auth device and the auth platform. Additionally the messages preferably include transaction information (i.e., metadata). The transaction information may include account or entity name, transaction details, location and time of transaction, IP address of initiating host, geolocation of the IP address or any suitable information or any suitable data on the transaction. In one example an online bank transfer may have a message with transaction information including payer, payee, account numbers, transfer amount, and transaction date and time.

Step S140, which includes receiving an authority agent response from the authority device to the auth platform, functions to process a response from an authentic user or authorized user. The response preferably confirms or denies a transaction. The confirmation and denial of a transaction may additionally be set to indicate any suitable form of response. Preferably, the initial options are to accept or reject a transaction. Additionally, if a transaction is rejected a reason for rejection may be included such as "canceled because of change of mind" or "possible malevolent transaction". Other variations may include a variety of options that may change based on the application. The available forms of responses may be included in the message information. Other forms of responses may allow a variety of multiple-choice options, variable setting options, or any suitable form of response input. For example, if a parent is acting as an authorization provider for an ATM withdraws made by a child, a message may be sent to a phone of the parent indicating that the child is attempting to withdraw a particular amount (e.g., $50). The parent may be able to respond allowing a withdrawal of only a lower amount (e.g., $20). As an additional sub-step to receiving an authority agent response, the response is preferably verified to be a legitimate response from the authority device as opposed to an entity imitating the device. Secure Socket Layer (SSL), a Hash-based Message Authentication Code (HMAC), message signing, or any suitable cryptographic protocol may be used to verify the response is from the authority device.

Step S150 and S152, which includes if the authority agent response confirms the transaction, communicating a confirmed transaction to the initiator, and if the authority agent response denies the transaction, communicating a denied transaction to the initiator, function to communicate the authentication and/or authorization to the initiator of the transaction. Any suitable response to a transaction is preferably communicated back to the requesting entity (e.g., a third party website or an ATM machine). The requesting entity can then preferably take appropriate action. If the transaction is confirmed or approved, the transaction proceeds. If the transaction is denied or altered, the requesting entity preferably halts or prevents the transaction. The requesting entity can preferably use the transaction response to modify a transaction state in any suitable manner. Based on the variety of responses from authentic users and/or authorized users, rules may determine when to confirm or deny a transaction. In a variation of the method, there may be a plurality of authority devices registered for authorization and/or authentication. A rule may be setup for which authority devices to message, in what order, and the timing of the messaging. Additionally, rules may be set for received responses. A particular threshold for the number of responses from the plurality of authority devices may be set. For example, four authority devices may be messaged for authorization and at least three must confirm the transaction for it to be confirmed. In another example, a plurality of authority devices for authentication may be registered, and the authority devices are messaged one after the other until at least one responds. The response from an authority agent may alternatively be passed on to the requesting entity with no analysis.

An alternative embodiment preferably implements the above methods in a computer-readable medium storing computer-readable instructions. The instructions are preferably executed by computer-executable components preferably integrated with an auth platform. The auth platform is preferably hosted on a distributed computing system or cloud based platform but may alternatively be hosted in any suitable system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The auth platform preferably includes an API for third party services and devices to use in initiating transactions and interpreting responses from the auth platform. The platform preferably includes a communication channel such as a public or private network or SMS network to communicate with at least one authority device. The authority device is preferably a mobile phone but may be any suitable personal computing device.

As a person skilled in the art will recognize from the previous detailed description and from the figures and claims, modifications and changes can be made to the preferred embodiments of the invention without departing from the scope of this invention defined in the following claims.

We claim:

1. A method of multi-factor authentication of a digital transaction, the method comprising:
   prior to initiating a digital transaction, registering a multi-factor authentication account and registering a mobile user device of a user in association with the multi-factor authentication account on a remote authentication service for performing a second factor of authentication for the digital transaction;
   at a third-party service provider:
      receiving a transaction request from an initiator using an initiating user device distinct from the registered mobile user device for initiating the digital transaction, the transaction request comprising user authentication credentials for performing a first factor of authentication at the third-party service provider;
      authenticating the initiator based on the user authentication credentials;
      in response to a successful authentication of the initiator, transmitting an application programming interface (API) request to a multi-factor authentication API server of the remote authentication service, the API request comprising an authentication request and transaction request data associated with the transaction request to the remote authentication service;
      preventing the remote authentication service from inspecting one or more features of the transaction request data from the third-party service provider, wherein the preventing includes encrypting the transaction request data at the third-party service provider prior to transmitting the transaction request data to the remote authentication service;
   at the remote authentication service comprising the multi-factor authentication API server:
      receiving the API request from the third-party service provider, wherein the transaction request data comprises (i) details of the transaction request and (ii) multi-factor authentication account identification data;
      using the multi-factor authentication account identification data to identify the multi-factor authentication account registered with and maintained by the remote authentication service;
      using the multi-factor authentication account to identify the mobile user device of the user that is registered in association with the multi-factor authentication account;
      in response to identifying the registered mobile device associated with the multi-factor authentication account, pushing an authentication message via a persistent connection from the multi-factor authentication API to an authentication service application hosted on the registered mobile device of the user, the authentication message comprising (a) the details of the transaction request and (ii) a request for either a confirmation input from the user that confirms the details of the transaction request or a denial input that denies the details of the transaction request;
      decrypting the transaction request data only at the registered mobile user device;
      receiving, from the authentication service application, an authentication response to the authentication notification, the authentication response comprising data of the confirmation input or data of the denial input;

returning, from the multi-factor authentication API server, an API response comprising authentication response data relating to the authentication response to the third-party service provider;

completing the digital transaction or denying the digital transaction based on the authentication response data.

2. The method of claim 1, further at the third-party service provider:

in response to receiving the authentication response data, transmitting a response to the transaction request from the third-party service provider to an electronic initiator device distinct from the registered mobile device of the user to the initiator.

3. The method of claim 1, wherein
the multi-factor authentication API server comprises an Internet-accessible server hosted on a distributed computing system.

4. The method of claim 1, wherein
the digital transaction is initiated in an online environment over one or more communication networks.

5. The method of claim 1, wherein
if the third-party service provider denies the digital transaction based on the authentication response data, dynamically altering increasing authentication requirements of a multi-factor authentication policy.

6. The method of claim 1, wherein
the persistent connection is provided via a push notification service of the mobile user device.

7. The method of claim 1, further comprising:
tracking the mobile user device;
identifying a change in an IP address of the mobile user device when the mobile user device moves from a first network to a second network;
initiating a second persistent connection between the remote multi-factor authentication service and the mobile user device;
updating a state of the mobile user device at the multi-factor authentication account at the remote multi-factor authentication service; and
messaging between the mobile user device and the multi-factor authentication service using the second persistent connection.

8. The method of claim 1, wherein
if the user of the mobile user device a denial input denying the transaction request, additionally receiving at the remote multi-factor authentication service a selection input of one of a plurality of available denial responses identifying a reason for the denial input.

9. The method of claim 1, wherein
completing the digital transaction includes if the authentication response from the mobile user device comprises confirmation input that confirms the transaction request, communication to the initiating user device a confirmation of the transaction request to the initiator.

10. The method of claim 1, wherein
denying the digital transaction includes if the authentication response from the mobile user device comprises denial input that denies the transaction request, communication to the initiating user device a denial of the transaction request to the initiator.

11. The method of claim 1, wherein
the transaction request comprises a request to access a digital account maintained by the third-party service provider.

12. The method of claim 1, wherein
the transaction request comprises a request to access a digital account through a website.

13. The method of claim 1, wherein
the transaction request comprises a permission request to perform an action on a computer system.

14. The method of claim 1, wherein
the persistent connection comprises a persistent TCP/IP connection between the remote multi-factor authentication service and the mobile device of the user.

15. The method of claim 1, wherein
the authentication message comprises a size-limited message to the mobile user device including a unique identifier of a full message that is larger than the size-limited message, and
the authentication response is received via the full message.

16. A method of multi-factor authentication of a digital transaction, the method comprising:
prior to initiating a digital transaction, registering a multi-factor authentication account and registering a mobile user device of a user in association with the multi-factor authentication account on a remote authentication service for performing a second factor of authentication for the digital transaction;
at a third-party service provider:
receiving a transaction request from an initiator using an initiating user device distinct from the registered mobile device for initiating the digital transaction, the transaction request comprising user authentication credentials for performing a first factor of authentication at the third-party service provider;
authenticating the initiator based on the user authentication credentials;
in response to a successful authentication of the initiator, transmitting an application programming interface (API) request to a multi-factor authentication API server of the remote authentication service, the API request comprising an authentication request and transaction request data associated with the transaction request to the remote authentication service;
at the remote authentication service comprising the multi-factor authentication API server:
receiving the API request from the third-party service provider, wherein the transaction request data comprises (i) details of the transaction request and (ii) multi-factor authentication account identification data;
using the multi-factor authentication account identification data to identify the multi-factor authentication account registered with and maintained by the remote authentication service;
using the multi-factor authentication account to identify the mobile user device of the user that is registered in association with the multi-factor authentication account;
in response to identifying the registered mobile user device associated with the multi-factor authentication account, pushing an authentication message via a persistent connection from the multi-factor authentication API to an authentication service application hosted on the registered mobile device of the user, the authentication message comprising (a) the details of the transaction request and (ii) a request for either a confirmation input from the user that confirms the details of the transaction request or a denial input that denies the details of the transaction request;
tracking the registered mobile user device;
identifying a change in an IP address of the registered mobile user device when the registered mobile user device moves from a first network to a second network;
initiating a second persistent connection between the remote multi-factor authentication service and the registered mobile user device;
updating a state of the registered mobile user device at the multi-factor authentication account at the remote multi-factor authentication service; and
messaging between the registered mobile user device and the remote authentication service using the second persistent connection;
receiving, from the authentication service application, an authentication response to the authentication notification, the authentication response comprising data of the confirmation input or data of the denial input;
returning, from the multi-factor authentication API server, an API response comprising authentication response data relating to the authentication response to the third-party service provider;
completing the digital transaction or denying the digital transaction based on the authentication response data.

* * * * *